United States Patent
Jabber et al.

(10) Patent No.: US 8,678,181 B2
(45) Date of Patent: Mar. 25, 2014

(54) CONVEYOR BELT ROLLER GUARD AND METHOD OF USING THE SAME

(75) Inventors: Majid J. Jabber, Toulon, IL (US); Justin M. Malohn, Peoria, IL (US); Christopher L. Schmelzer, Rock Island, IL (US)

(73) Assignee: Martin Engineering Company, Neponset, IL (US)

( * ) Notice: Subject to any disclaimer, the term of this patent is extended or adjusted under 35 U.S.C. 154(b) by 235 days.

(21) Appl. No.: 13/046,444

(22) Filed: Mar. 11, 2011

(65) Prior Publication Data
US 2012/0227232 A1 Sep. 13, 2012

(51) Int. Cl.
*B65G 21/10* (2006.01)
*B65G 21/16* (2006.01)
*B23P 6/00* (2006.01)

(52) U.S. Cl.
USPC ............. 198/860.3; 198/860.4; 198/860.5; 198/735.3; 198/735.4; 198/735.6; 193/35 R; 193/37

(58) Field of Classification Search
USPC .......... 198/860.3, 860.4, 860.5, 735.3, 735.4, 198/735.6; 193/35 R, 37
See application file for complete search history.

(56) References Cited

U.S. PATENT DOCUMENTS

| | | | | | |
|---|---|---|---|---|---|
| 1,366,103 | A | * | 1/1921 | Sturtevant | 198/860.3 |
| 2,801,730 | A | * | 8/1957 | Strickler | 193/35 R |
| 3,575,274 | A | * | 4/1971 | Ewing et al. | 198/321 |
| 3,581,878 | A | * | 6/1971 | Jacobson | 198/860.3 |
| 3,842,805 | A | * | 10/1974 | Patz | 119/57.7 |
| 3,878,936 | A | * | 4/1975 | Niggemyer | 198/860.5 |
| 5,400,897 | A | * | 3/1995 | Doyle | 198/860.5 |
| 5,947,266 | A | * | 9/1999 | Rionde | 198/860.3 |
| 6,318,545 | B1 | | 11/2001 | Ross, II | |
| 6,811,021 | B1 | | 11/2004 | Corley | |
| 7,284,658 | B2 | | 10/2007 | Wiggins et al. | |
| 2006/0163041 | A1 | | 7/2006 | Wiggins et al. | |
| 2006/0254887 | A1 | * | 11/2006 | Aubry et al. | 198/860.3 |
| 2007/0295583 | A1 | | 12/2007 | Hall et al. | |
| 2010/0072037 | A1 | | 3/2010 | Jabber et al. | |

* cited by examiner

*Primary Examiner* — Gene Crawford
*Assistant Examiner* — Matthew Marotta
(74) *Attorney, Agent, or Firm* — Thompson Coburn LLP; Clyde L. Smith

(57) ABSTRACT

A conveyor belt roller guard comprises opposite first and second longitudinal side panels, opposite transverse side panels, and a bottom panel. The first and second longitudinal side panels, the transverse side panels, and the bottom panel are arranged in a manner adapted to define a u-shaped trough that comprises a cavity that is open from above. The first longitudinal side panel has a lower portion that is hinged relative to the transverse side panels about a first pivot axis in a manner such that the first longitudinal side panel can be swung downward while the bottom panel and the transverse side panels remain stationary. The first pivot axis extends substantially horizontal and parallel to the first longitudinal side panel.

8 Claims, 4 Drawing Sheets

CONVEYOR BELT ROLLER GUARD AND METHOD OF USING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to bulk material conveyor belt assemblies. More specifically, this invention pertains to a conveyor belt roller guard having swing down panels for servicing the conveyor belt roller and for servicing the conveyor belt guard itself.

2. General Background

Bulk material conveyor belt assemblies create a hazard to nearby workers when such conveyor belt assemblies are in operation. As such, the Mine Safety and Health Administration of United States Department of Labor and other mine safety organizations and administrations impose numerous regulations on the operation of conveyor belt assemblies. The most dangerous aspect of operating conveyor belt assemblies involves the unintentional intake of clothing or human limbs between a moving conveyor belt and the rollers that support the weight of the conveyor belt. Due to the enormous momentum and weight of the bulk material frequently carried on a conveyor belt, once clothing or limbs gets trapped between a moving conveyor belt and a roller, a worker is virtually helpless at preventing serious injury or death. For this reason, some conveyor belt rollers are surrounded by a guard or cage that helps prevent loose clothing, tools, or human limbs from getting drawn into the pinch point between a roller and the conveyor belt. Such conveyor belt roller guards also serve another benefit in that they can act as a net to catch components of the roller that have failed and have fallen from the conveyor belt roller.

It should be appreciated that, periodically conveyor belt rollers require servicing. For example, a conveyor belt roller may need bearings lubricated or replaced, a failed part may need replacement, or the roller may need to be cleaned to remove caked-on carryback material that can damage or misalign the belt. For this reason, conveyor belt return guards are often configured to be removable or to selectively provide access to the return roller when needed. Nonetheless, it can appreciated from the invention described below, conveyor belt roller guards can be made more practical.

SUMMARY OF THE INVENTION

The present invention pertains to a roller guard having panels that can selectively be swung downward to provide access to the roller and to facilitate the cleaning of the roller and the guard. The roller guard of the preferred embodiment also comprises other novel features.

In a first aspect of the invention, a conveyor belt roller guard comprises opposite first and second longitudinal side panels, opposite transverse side panels, and a bottom panel. The first and second longitudinal side panels, the transverse side panels, and the bottom panel are arranged in a manner adapted to define a u-shaped trough that comprises a cavity that is open from above. The first longitudinal side panel has a lower portion that is hinged relative to the transverse side panels about a first pivot axis in a manner such that the first longitudinal side panel can be swung downward while the bottom panel and the transverse side panels remain stationary. The first pivot axis extends substantially horizontal and parallel to the first longitudinal side panel.

In another aspect of the invention, a method of guarding a conveyor belt roller comprises positioning a conveyor belt roller guard relative to the conveyor belt roller. The conveyor belt roller guard comprises opposite first and second longitudinal side panels, opposite transverse side panels, and a bottom panel. The first and second longitudinal side panels, the transverse side panels, and the bottom panel are arranged in a manner adapted to define a u-shaped trough that comprises a cavity that is open from above. The first longitudinal side panel has a lower portion that is hinged relative to the transverse side panels about a first pivot axis in a manner such that the first longitudinal side panel can be swung downward while the bottom panel and the transverse side panels remain stationary. The first pivot axis extends substantially horizontal and parallel to the first longitudinal side panel. The positioning occurs in a manner such that a majority of the conveyor belt roller is positioned within the cavity of the conveyor belt roller guard.

In yet another aspect of the invention, a method of servicing a conveyor belt system comprises accessing a conveyor belt system. The conveyor belt system comprises a conveyor belt, a conveyor belt roller, and a conveyor belt roller guard. The conveyor belt roller is engaged with and supports the conveyor belt. The conveyor belt guard comprises opposite first and second longitudinal side panels, opposite transverse side panels, and a bottom panel. The first and second longitudinal side panels, the transverse side panels, and the bottom panel are arranged in a manner adapted to define a u-shaped trough that comprises a cavity that is open from above. The first longitudinal side panel has a lower portion that is hinged relative to the transverse side panels about a first pivot axis in a manner such that the first longitudinal side panel can be swung downward while the bottom panel and the transverse side panels remain stationary. A majority of the conveyor belt roller is positioned within the cavity of the conveyor belt roller guard. The method also comprises pivoting the first longitudinal side panel about the first pivot axis in a manner such that the first longitudinal side panel swings downward from an upright position to a service position while the bottom panel and the transverse side panels remain stationary. Still further, the method comprises inserting a tool at least partially into the cavity of the conveyor belt roller guard while the first longitudinal panel is in the service position.

Further features and advantages of the present invention, as well as the operation of the invention, are described in detail below with reference to the accompanying drawings.

Figure 1:
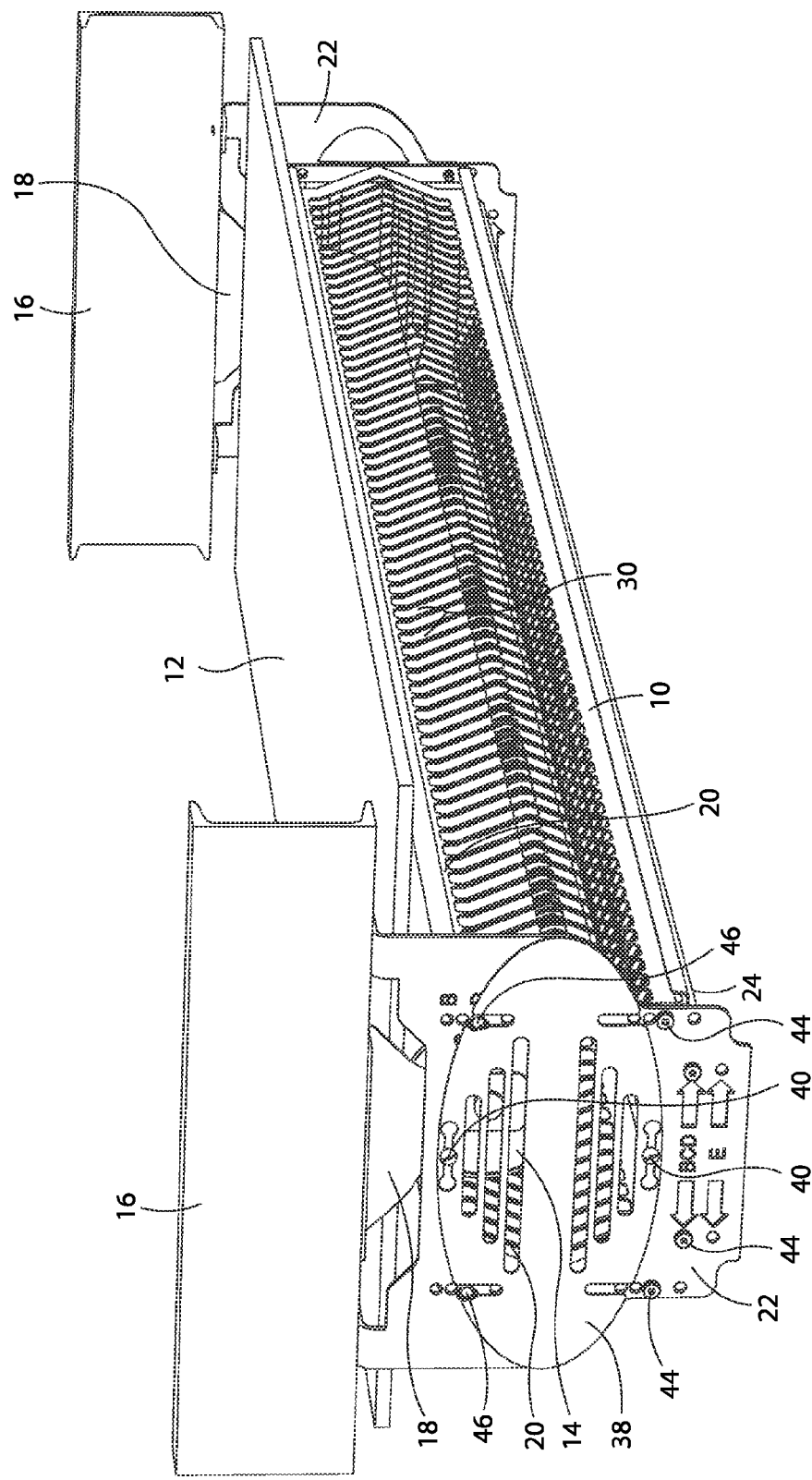
FIG. 1 is a perspective view showing an embodiment of a roller guard in accordance with the invention shielding a roller beneath a conveyor belt.

Reference numerals in the written specification and in the drawing figures indicate corresponding items.

DETAILED DESCRIPTION

A conveyor belt roller guard 10 is shown in FIG. 1 beneath a conveyor belt 12 in a manner forming a partial cage around a conveyor belt roller 14. The roller guard 10 is secured to and hangs from the stringers 16 of the conveyor belt system and is preferably not directly attached to the roller 14 or the roller mounts 18. This allows the entire roller guard 10 to be removed from the conveyor belt system without disturbing or modifying the roller 14.

Figure 2:
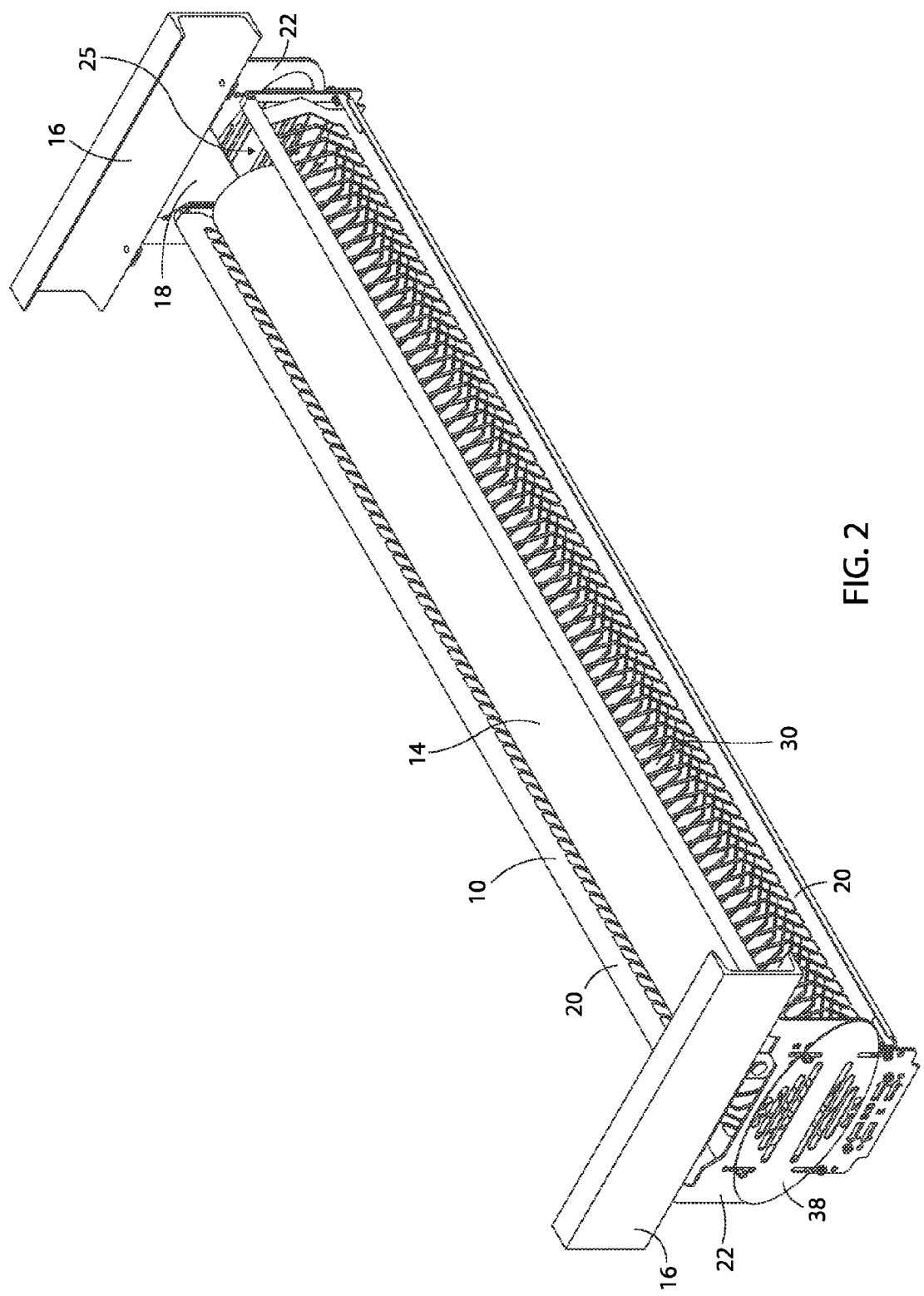
FIG. 2 is another perspective view of the roller guard shown in FIG. 1, and is shown without the conveyor belt.

The roller guard 10 primarily comprises opposite longitudinal side panels 20, opposite transverse side panels 22, and a bottom panel 24. During normal operation of the conveyor belt system, these panels form a u-shaped trough that comprises a cavity 25 that is open from above (as is shown in FIG. 2). The longitudinal side panels 20 and the bottom panel 24 preferably each have identical configurations. As such, the configuration of bottom panel 24 described infra, applies also to the longitudinal side panels 20. The bottom panel 24 is preferably formed of steel and has a v-shaped transverse cross-section. This v-shaped transverse cross-section provides two primary advantages. The v-shaped cross-section provides the bottom panel 24 with an upwardly facing concave face that extends longitudinally along almost the entire length of the bottom panel. As explained below in greater detail, the concave face can be used to support the roller 14 during installation or removal of the roller without running the risk that the roller will simply roll off of the bottom panel 24. Additionally, the v-shaped transverse cross-section allows the bottom panel 24, as a whole, to be positioned closer to the roller 24 since the center portion 26 of the v-shaped cross-section is beneath the opposite end portions 28 of the cross-section (the same applies to the longitudinal side panels). In addition to the v-shaped transverse cross-section, the bottom panel 24 comprises a plurality of elongate transverse openings 30 that extend through the bottom panel 24 (giving the bottom panel a grill-like appearance), and support bracket 32 attached to each of its opposite longitudinal ends. Two mounting holes 34 extend through each support bracket 32.

Figure 3:
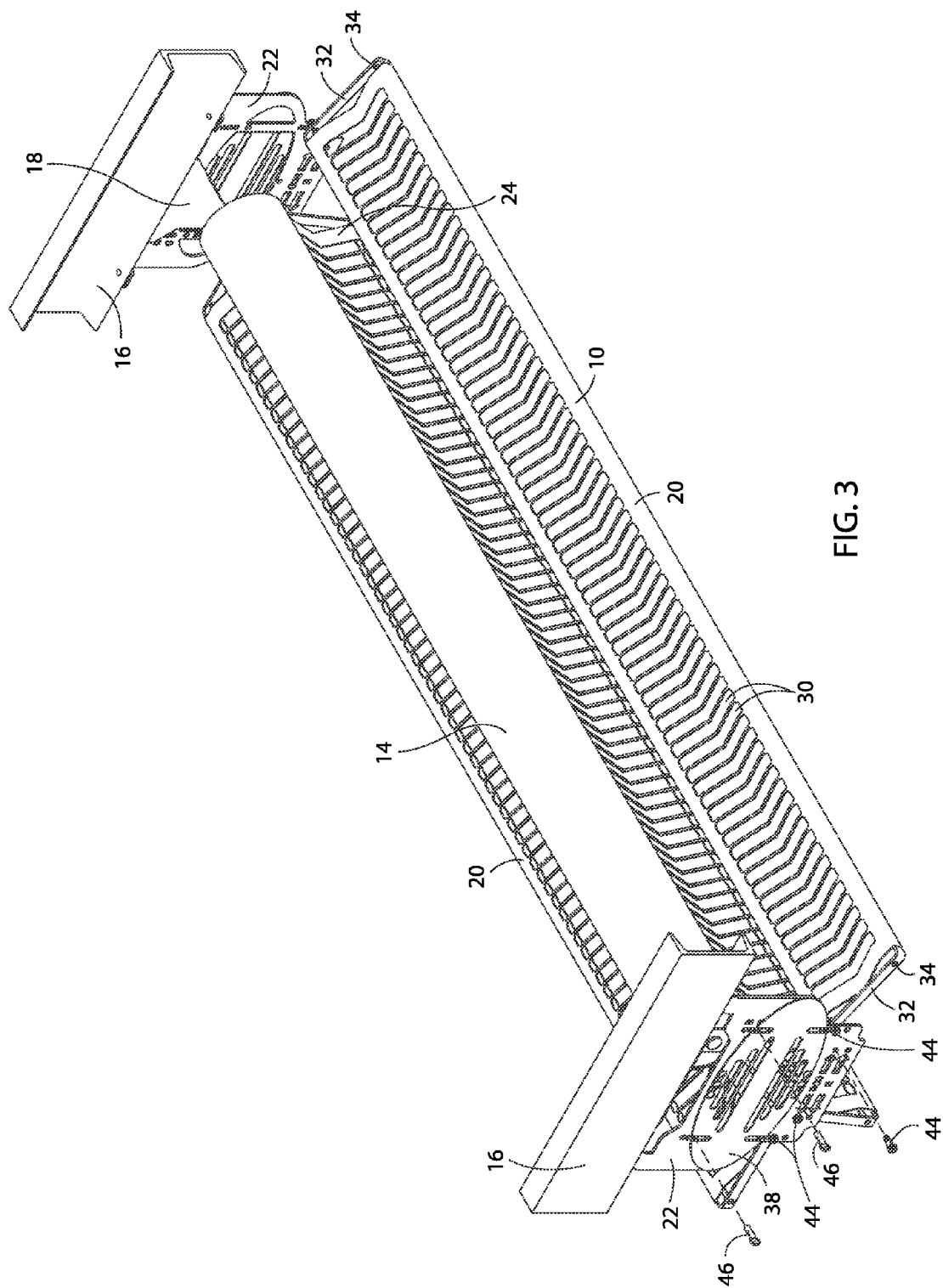
FIG. 3 is a perspective view similar to FIG. 2 but with the longitudinal side panels and the bottom panel swung down for servicing the guard or roller.
Figure 4:
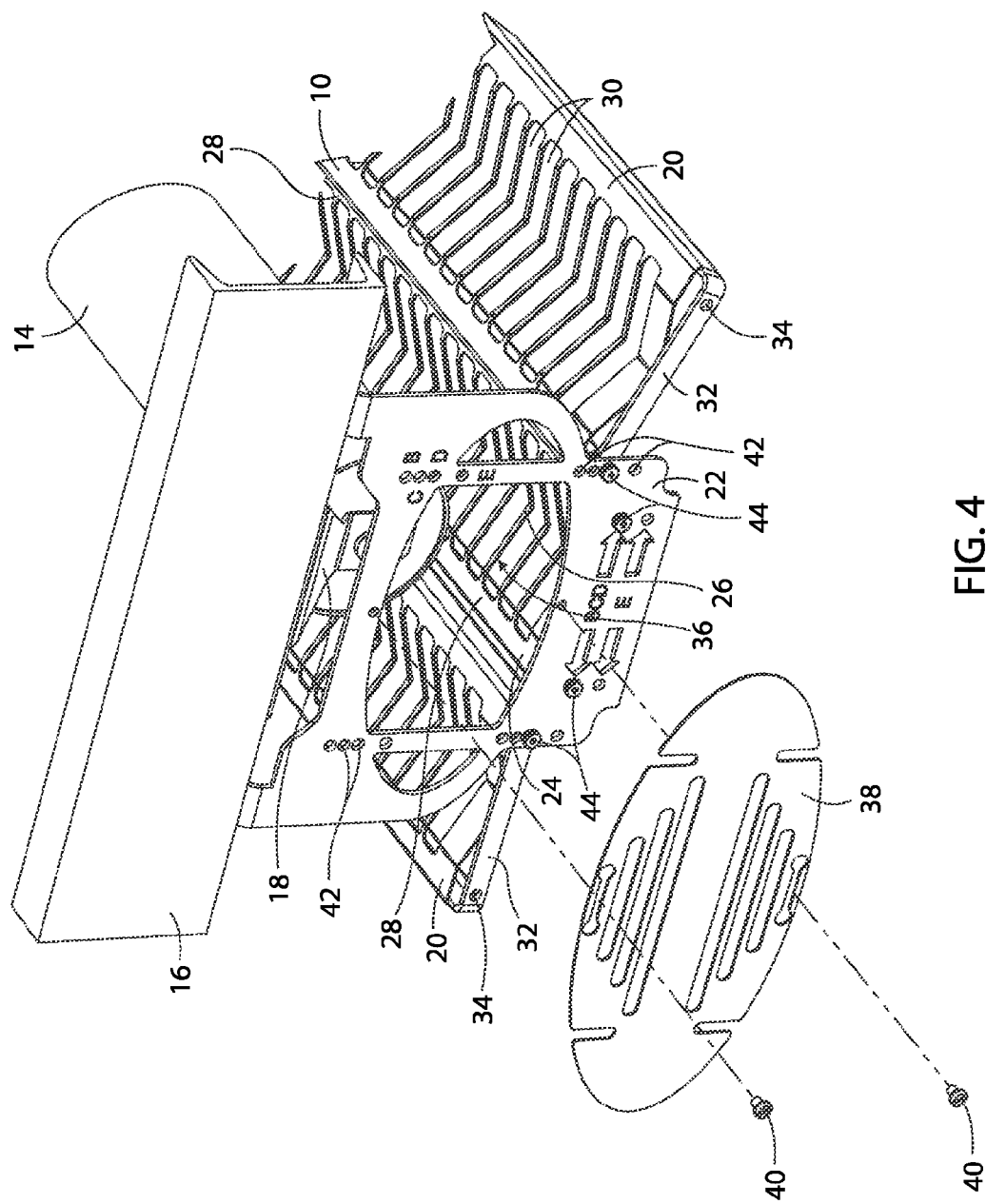
FIG. 4 is a partial view showing a perspective of one end of the roller guard and is shown with the longitudinal side panels swung down and the access cover of one of the transverse side panels removed from the remainder of the transverse side panel.

The longitudinal side panels 20 and the bottom panel 24 are attached to the transverse side panels 22. The transverse side panels 22 are attached to and suspended from the stringers 16 of the conveyor belt system. Each of the transverse side panels 22 comprises an access opening 36 and an access cover 38. As shown in FIG. 4, the access cover 38 is removably attached to the remainder of the transverse side panel 22 via fasteners 40. Each transverse side panel 22 also comprises a plurality of alternative mounting openings 42 configured to support the longitudinal side panels 20 and the bottom panel 24. The alternative mounting openings 42 are configured to support the longitudinal side panels 20 and the bottom panel 24 in various spacial relationships to accommodate various sizes of conveyor belt rollers 14. Each longitudinal side panel 20 is mounted to each transverse side panel 22 via a pivot fastener 44 (preferably a threaded bolt or screw) located near the bottom of the opposite ends of the longitudinal side panel via the mounting holes 34 provided in the support bracket 32 of the longitudinal side panels. The top of each of the longitudinal side panels 20 is removably attached to the transverse side panels 22 via a detent pin 46. As such, removal of the detent pins 46 allows the longitudinal side panels 20 to swing downward about the pivot fasteners 44 as shown in FIGS. 3 and 4. The bottom panel 24 is secured to the transverse side panels 22 via pivot fasteners connected to each of its mounting holes 34. Thus, the bottom panel 24 can be selectively swung down in either direction by removing either two of the pivot fasteners 44.

The conveyor belt roller guard 10 can be attached around an existing conveyor belt roller 14. This is done by attaching the transverse side panels 22 to the stringers 16 of the conveyor belt system adjacent the opposite longitudinal ends of the roller 14 such that all but the top of the roller is positioned within the cavity 25 of the roller guard 10. As such, the roller guard 10 substantially surrounds the roller 14 and prevents objects and clothing from inadvertently being drawn into the pinch-point between the roller and the conveyor belt 12. The transverse openings 30 in the longitudinal side panels 20 and in the bottom panel 24 allow bulk material dust to pass therethrough and therefore prevent the roller guard 10 from filling up with debris.

When required, the roller 14 can be easily serviced and the roller guard 10 can be easily cleaned. The roller guard 10 provides many access methods for doing this and, in some cases, even makes the servicing of the roller 14 easier to achieve. To clean the roller 14 or the roller guard 10, either of the longitudinal side panels 20 can be swung down simply by removing the appropriate detent pins 46. Additionally, the bottom panel 24 can be swung down in either direction by removing the appropriate pivot fasteners 44. The longitudinal side panels 20 and the bottom panel 24 can also fairly easily be removed simply by removing all of the detent pins 46 and the pivot fasteners 44. Moreover, the longitudinal ends of the roller 14 can be accessed through the access openings 36 of the transverse side panels 22 simply by removing the access cover fasteners 40 and the access covers 38 themselves. If for some reason the roller 14 needs to be removed from the conveyor belt system or a new roller needs to be installed, the bottom panel 24 of the roller guard 10 can support the roller during the process. The roller 14 can temporarily be laid on the concave surface of the bottom panel 24 without the risk of rolling off of the bottom panel. Thus, less effort is required to install or remove the roller.

In view of the foregoing, it should be appreciated that the invention achieves several advantages over prior art conveyor belt roller guards.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A conveyor belt roller guard comprising:
opposite first and second longitudinal side panels, opposite transverse side panels, and a bottom panel, the first and second longitudinal side panels, the transverse side panels, and the bottom panel being arranged in a manner adapted to define a u-shaped trough that comprises a cavity that is open from above, the first longitudinal side panel having a lower portion that is hinged relative to the transverse side panels about a first pivot axis in a manner such that the first longitudinal side panel can be swung downward while the bottom panel and the transverse side panels remain stationary, the first pivot axis extending substantially horizontal and substantially parallel to the first longitudinal side panel, the second longitudinal side panel having a lower portion that is hinged relative to the transverse side panels about a second pivot axis in a manner such that the second longitudinal side panel can be swung downward while the bottom panel and the transverse side panels remain stationary, the bottom panel having a longitudinal edge portion that is hinged relative to the transverse side panels about a third pivot axis in a manner such that the bottom panel can be swung downward while the longitudinal side panels and the transverse side panels remain stationary, the first, second, and third pivot axes being substantially parallel to each other.

2. A conveyor belt roller guard in accordance with claim 1 wherein each of the first and second longitudinal side panels is directly connected to and supported by each of the transverse side panels.

3. A conveyor belt roller guard in accordance with claim 1 wherein each of the transverse side panels comprises a removable access cover that, when removed, provides access into the cavity through the respective transverse side panel.

4. A conveyor belt roller guard in accordance with claim 1 wherein the first longitudinal side panel is selectively lockable in an upright position in a manner such that the first longitudinal side panel is pivotally fixed relative to the transverse side panels and the bottom panel and cannot be swung downward.

5. A conveyor belt roller guard in accordance with claim 1 wherein the first and second longitudinal side panels, the transverse side panels, and the bottom panel each include perforations.

6. A conveyor belt roller guard in accordance with claim 1 wherein the bottom panel has a longitudinal length and a transverse cross-section, the transverse cross-section comprises a center portion and opposite end portions and extends substantially the length of the bottom panel, and the center portion is beneath the end portions.

7. A conveyor belt system comprising:
an endless conveyor belt;
a conveyor belt roller, the conveyor belt roller being engaged with and supporting the conveyor belt;
a conveyor belt roller guard, the conveyor belt roller guard comprising opposite first and second longitudinal side panels, opposite transverse side panels, and a bottom panel, the first and second longitudinal side panels, the transverse side panels, and the bottom panel being arranged in a manner adapted to define a u-shaped trough that comprises a cavity that is open from above; the first longitudinal side panel having a lower portion that is hinged relative to the transverse side panels about a first pivot axis in a manner such that the first longitudinal side panel can be swung downward while the bottom panel and the transverse side panels remain stationary, the first pivot axis extending substantially horizontal and substantially parallel to the first longitudinal side panel, a majority of the conveyor belt roller being within the cavity of the conveyor belt roller guard, the bottom panel having a longitudinal edge portion that is hinged relative to the transverse side panels about a second axis in a manner such that the bottom panel can be swung downward while the longitudinal side panels and the transverse side panels remain stationary, the second axis being substantially parallel to the first pivot axis.

8. A method of guarding a conveyor belt roller, the method comprising:
positioning a conveyor belt roller guard relative to the conveyor belt roller, the conveyor belt roller having an axis of revolution, the conveyor belt roller guard comprising opposite first and second longitudinal side panels, opposite transverse side panels, and a bottom panel, the first and second longitudinal side panels, the transverse side panels, and the bottom panel being arranged in a manner adapted to define a u-shaped trough that comprises a cavity that is open from above; the first longitudinal side panel having a lower portion that is hinged relative to the transverse side panels about a first pivot axis in a manner such that the first longitudinal side panel can be swung downward while the bottom panel and the transverse side panels remain stationary, the first pivot axis extending substantially horizontal and substantially parallel to the first longitudinal side panel and the axis of revolution of the conveyor belt roller, the positioning occurring in a manner such that a majority of the conveyor belt roller is positioned within the cavity of the conveyor belt roller guard.

\* \* \* \* \*